May 20, 1952     A. H. D. KLIE     2,597,836
FISHING BOBBER
Filed June 24, 1948     2 SHEETS—SHEET 1
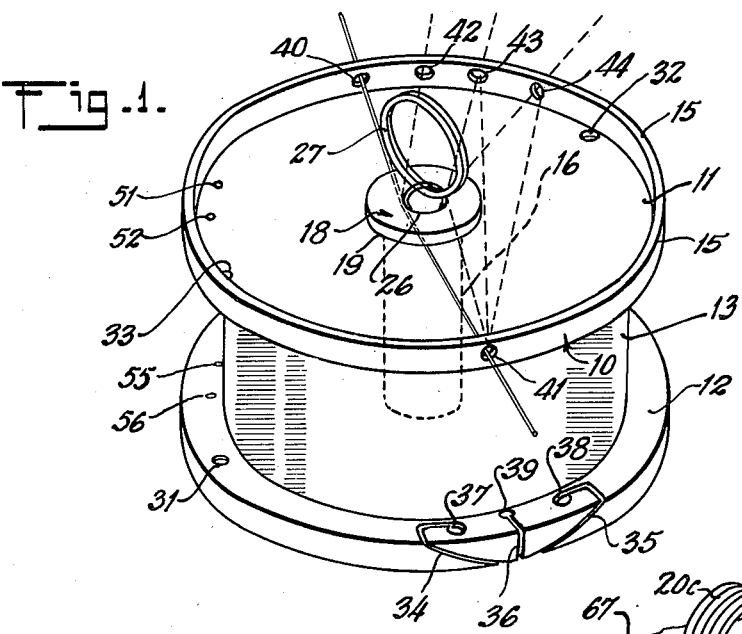
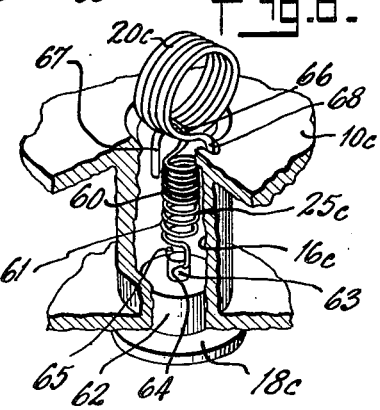
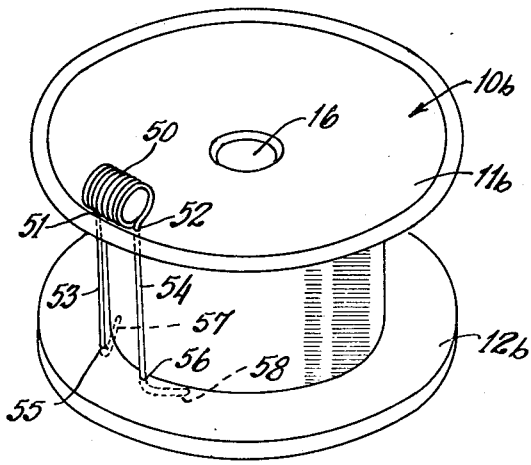
INVENTOR
AUGUST H. D. KLIE
BY Robert Irving William
ATTORNEY May 20, 1952 A. H. D. KLIE 2,597,836
FISHING BOBBER
Filed June 24, 1948 2 SHEETS—SHEET 2
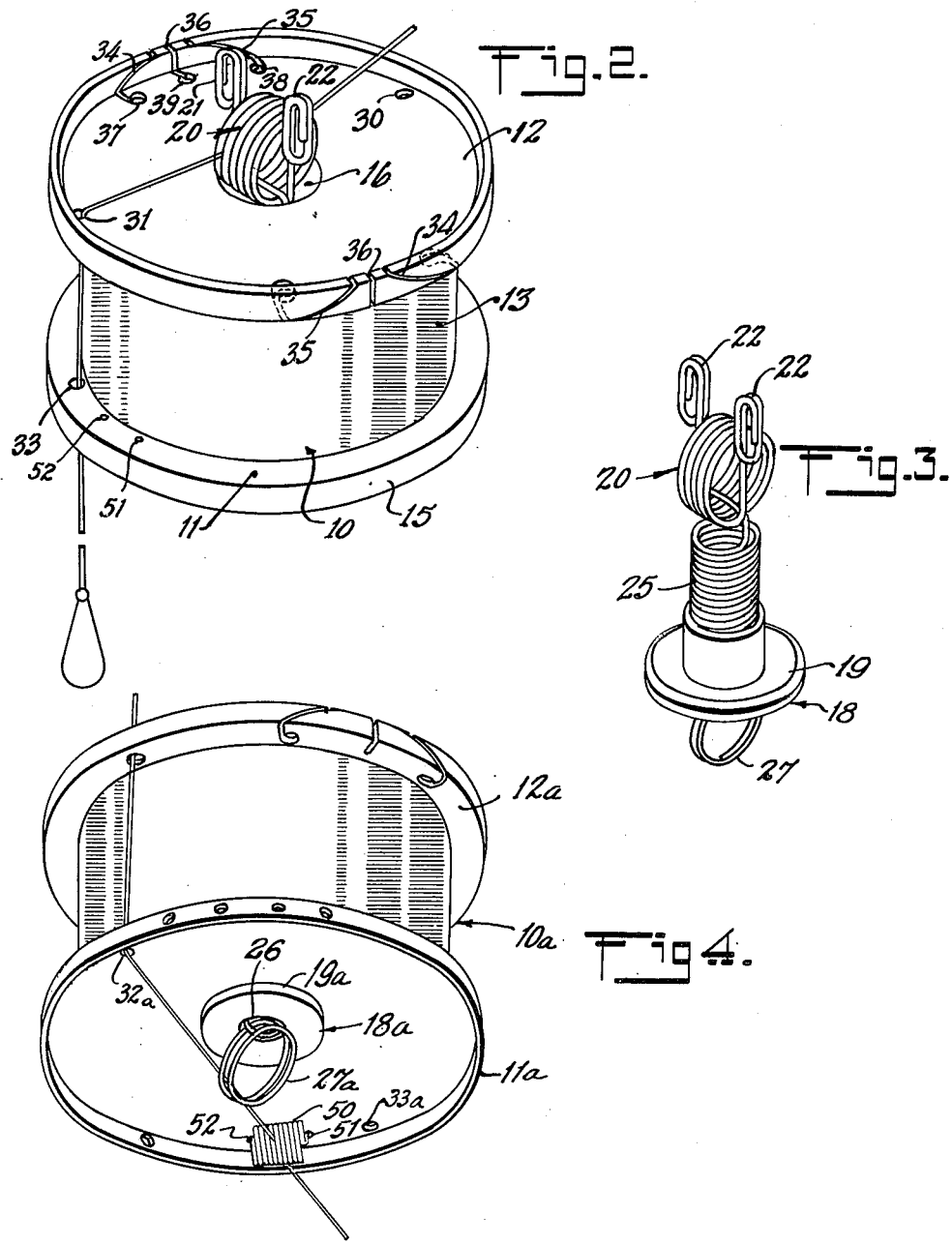
INVENTOR
AUGUST H.D. KLIE
BY
Robert Irving Williams
ATTORNEY Patented May 20, 1952

2,597,836

UNITED STATES PATENT OFFICE 2,597,836

FISHING BOBBER

August H. D. Klie, Staten Island, N. Y.

Application June 24, 1948, Serial No. 35,029

7 Claims. (Cl. 43—44.95)

This invention relates to fishing bobbers, and has for an object the provision of fishing bobbers which are adapted for use under a wide variety of conditions for the accomplishment of a wide variety of purposes. A more specific object is the provision of improved types of bobbers which are basically line-carrying bobbins on which fishing line may be wound for sale.

A fisherman who, at various times during the year or during a vacation, engages in different types of fishing activities such as still fishing from a boat or from a bank, or trolling, and chumming, or who fished for various types of fish, in bodies of water of varying character, or under varying conditions, had to supply himself with a large number of types of bobbers to satisfy the varying requirements of his various situations and needs. This condition has become more demanding with the development of improved specialized types of bobbers, such as bobbers thru which the line will slide when the bobber reaches the rod, bobbers which are releasable by a pull of the rod, bobbers which are releasable by a pull of a fish, trolling bobbers, chumming bobbers, casting floats, depth finders, buoy markers, and the like.

Furthermore, in my copending application, Serial No. 16,449, filed March 23, 1948, I have described and claimed types of bobbers which are in essence the hollow-plastic bobbins on which fish line is originally sold. This type of merchandising is a great aid to fishermen, and an important selling point for the manufacturer; but in order to avoid the manufacture and stocking of a large number of types of line-wound bobbins for sale, it is desirable that the adapted buoyant bobbins be utilizable as bobbers for a large numer of the various purposes in which a particular purchaser may be interested.

With the foregoing and other considerations in view, the present invention contemplates the provision of bobbin-type bobbers which are simple of construction, well adapted for their primary line-holding purpose, and are nevertheless utilizable effectively and efficiently for any of a wide number of types or conditions of fishing in which the purchaser of the line and bobbin may wish to engage.

In accordance with the invention there are provided bobbers embodying various combinations of advantageous features including such features as line-catches disposed on opposite sides of the bore of a bobbin, the coil-spring in the bore of a bobbin holding one or more line-catches in place, improved clip-type and, more specifically, annulus-type line-catch arrangements, the provision of a handle member beyond a clip- or annulus-type line-catch, the provision of a line-catch mounted on the outside of the flange of a bobbin and of highly advantageous mounting means therefor, the provision of oppositely-disposed holes in line with a bore-seated line-catch thru which a line adapted to be caught by the line-catch may be run, the provision of means protruding axially outside of a bobbin flange and the provision of guide holes or other guide means therein, and the provision of improved arrangements of guide means for a line with which the bobber is employed.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention, reference should be had to the following detailed description taken in connection with the accompanying drawings, in which:

Figure 1 is a perspective view of a bobbin-bobber embodying the invention with that side uppermost on which there is mounted the line-catch clip and illustrating certain manners of gripping a line therein;

Fig. 2 is a view similar to Figure 1 showing the device with that side uppermost on which there is mounted the line-catch helix and illustrating a manner of holding a line therein;

Fig. 3 is a detail view of the line-catches of the bobber of Figs. 1 and 2 connected by a coil-spring illustrated in a contracted position.

Fig. 4 is a perspective view, with the line-catch clip lowermost, of a modified form of construction;

Fig. 5 is a view similar to Fig. 1 illustrating a further modified form of construction; and Fig. 6 is a fragmentary central cut-away view illustrating a modified form of connecting spring and line clip.

In the form of construction exemplified in Figures 1 and 2, therethrough there is provided a bobbin 10 having a central bore therethrough having at its ends flanged portions 11 and 12 providing therebetween an annular recess 13 on which a line may be wound for sale. At the periphery of the flange 11 and forming a part of the flanged portion there protrudes axially a portion 15 which, in the present instance, is in the form of a rim. At one side of the bobbin—in the present instance the same side from which the rim 15 extends—near its bore 16 there is provided a lateral line-catch clip which in the present instance is in the form of an annular disc 18, the periphery of the underside of which is chamfered, as at 19, to facilitate the slipping of line thereunder. At the other side of the bobbin near the other end of the bore 16 there is provided an axial line-catch in the form of a plurality of turns of resiliently-contacting wire which, in the present instance, are in the form of a helix 20 having its axis substantially at right angles to the axis of the bore. In the present instance also the ends of the helix extend outwardly as at 22 so that the helix may be readily spread by moving one or both of these to more easily permit the entry of a line to be caught thereby and to avoid fraying. The diameter of the helix 20 is greater than that of the bore 16, and there is provided within the bore 16 a coil-spring 25, one end of which is secured to the helix 20 and the other end of which extends thru the bore 26 in the annulus 18 and is so mounted as to yieldably urge the clip 18 against the bobbin 10. In the present instance this other end of the coil-spring is secured to a handle portion which, as exemplified, is in the form of a handle-loop 27 embodying a plurality of turns of wire of such diameter that a finger may be readily thrust therethru and, at all events, of a greater lateral extent thru the bore 26 of the annulus. This enables the tension on the clip 18 to be relieved when desired to facilitate the insertion of a line thereunder and to minimize tendencies toward fraying. In order to guide one or both of the portions extending from the helix 20 of a line adapted to be caught thereby, there are provided in the flange 12 axial holes 30 and 31; and, for instances where only one portion of the line is to be caught but where it is desirable that this portion be guided at two points, there is provided in the flange 11, and inside the rim 15 in the present instance, a hole 32 in line with the line 30 and a hole 33 in line with the hole 31. There are likewise provided in the flange 12 angularly-disposed line-catching slots 34 and 35, and a radially-disposed line-catching slot 36, terminating respectively in line-guiding holes 37, 38, and 39.

In order to guide one or more of the portions extending from the clip 18 of a line adapted to be caught thereby there are provided in the rim 15 oppositely-disposed laterally-extending holes 40 and 41, and in order to permit a line to be caught with varying tendencies to pull loose, and to be extended thru the rim for any of a wide variety of purposes there are provided in the rim additional holes exemplified at 42, 43, and 44.

There is thus provided a bobbin which will serve as a bobber for any of a wide variety of uses, its initial use being to be sold with line wound in the annular recess 13 thereof. After the line has been transferred to a fishing reel or otherwise used, the bobbin is ready to be employed as a bobber.

If the fisherman wishes to employ the bobbin as a releasable-retrievable float for still fishing, he may run a line from the rod thru the hole 30 and thence thru the hole 32 (or thru the hole 31 and thence thru 33) and then catch it in the helix 20 whence it may be released by a sudden upward movement of the rod tip after which the line will slide freely thru the holes 30 and 32 (or 31 and 33).

For chumming and trolling the line may be run from the rod thru the hole 32 and thence thru the hole 30, and then caught in the helix 20 so that the helix faces the hook. When a fish strikes, it will pull the line loose from the helix and be able to pull the line out freely thru the holes 30 and 32.

When it is desired to use the bobbin as a stationary (locked) or set float, the line may be run between the holes 30 and 31 and caught in the helix 20 on the top plate. Or when used on the bottom plate the line may be run thru hole 42 or 43 on the far side with one turn around and under the washer clip 18 and then thru 41.

When a sliding float is desired, the line may be run between the holes 40 and 41 and under clip 18. It is to be noted that the tension of the coil-spring is insufficient to completely prevent movement of the line under the clip, but is merely sufficient to resist the same, thus permitting the line to be reeled in after the bobber reaches the rod tip. Greater tension is not desirable but if wanted may be obtained by running line thru hole 42 first instead of 41.

To provide a casting float the line is run thru the holes 30 and 32 or 31 and 33 and the line knottted to act as a stopper at a length corresponding to the desired depth between the bobber and hook.

The construction is well adapted for use as a depth finder. The line is wound in the groove 13, the bobbin held by the handle, helix, or elsewhere, and the line permitted to be uncoiled by the weight of the sinker until the sinker hits bottom. A very effective operation results from pulling the helix and the handle slightly away from each other to relieve all tension on the bobbin while the sinker is falling. After the depth has been found, the line can be snapped into the helix or under the clip, and the bobbin-bobber will serve very effectively as a buoy marker.

By utilizing the various tensions available when the line is run thru one of the holes 42, 43, or 44, thence under the near side of the clip 18, and thence thru the hole 41, there are provided releasable-retrievable floats adapted for use in catching varying kinds of fish and particularly the smaller varieties. The tension may be controlled not only by choosing the proper hole thru which to pass the line, but also by controlling the radial distance that the line is projected under the clip 18.

The handle-loop 27 may also be utilized as a guide hole, as for a line caught or to be caught in the helix.

In instances where a supplemental peripheral line-catch is desirable for use, where it is desired to leave the bore of the bobbin free, or where a boreless bobbin is utilized, there may be provided a construction such as exemplified in Fig. 4 or 5. In these constructions there are provided, respectively, a bobbin 10a having flanges 11a and 12a and a bobbin 10b having flanges 11b and 12b. At the outside of each of the flanges 11a and 11b there is provided a plurality of contacting turns of resilient wire which, in the present instance, are in the form of a helix 50, and the flanges 11a and 11b are each formed with small holes 51 and 52 thru which the ends 53 and 54 of the wire forming the helix extend. In the present instance the flanges 12a and 12b are each formed with alined similar holes 55 and 56, and the end portions 53 and 54, after extending across the base of the groove 13, extend thru these holes and are bent over beyond them as shown at 57 and 58. This provides a line-catch which is conveniently located with respect to a number of line-guiding openings or which can be effectively used with a bobbin wherein the bore is the only line-guiding opening, but which is effectively out of the groove 13 so as not to reduce the amount of line which may be wound in the groove. Fig. 4 shows an arrangement of this nature in which the various other features of Figs. 1–2 are included, and Fig. 5 shows a simplified bobbin 10b such as commonly used for the winding and sale of fishline.

A wide variety of types of means for yieldably drawing together line-catches at opposite ends at the central bore of a bobbin may be employed. Coil-springs are particularly advantageous. One of the many possible variants of the coil-spring of Figs. 1–3 is illustrated in Fig. 6. This spring 25c has a tightly coiled portion 60 and a loosely coiled portion 61. In the present instance the line-catch clip 13c is formed with a cylindrical stem 62 which fits in the bore 16c of the bobbin 10c and from which there projects a small cylinder 63 having a hole 64 therein for the reception of one end portion 65 of the coil spring 25c. The other end portion 66 is caught around the central strand of the helix 20c, the ends 67 and 68 of which are, in the present instance, bent downwardly into grooves recessed laterally from the bore 16c.

Since certain changes may be made in the above article and different embodiments of the invention could be made without departing from the scope thereof, it is intended that all matter contained in the above description or shown in the accompanying drawing shall be interpreted as illustrative and not in a limiting sense.

I claim:

1. A bobber comprising a buoyant bobbin having a central bore therethru and having mounted on one end thereof a helical line-catch with its axis substantially at right angles to the axis of said bore and with a minor portion of each turn seated beneath a plane extending generally transverse to the axis of the bore and tangent to the outermost portions of said end and a major portion of each turn projecting above said plane, and having line-guide means in association with the other end thereof.

2. A line-catch as set forth in claim 1 wherein said bobbin is provided with flanges and said line-guide means is in the form of holes in the flanged portion of said end.

3. A bobber as set forth in claim 1 having a line-clip at said other end of the bobbin and resilient means in said bore, said resilient means acting at one of its ends upon said line-clip and being anchored at its other end, so as to hold said line-clip against said other end of the bobber.

4. A bobber as set forth in claim 3 wherein said helical line-catch is seated in one end of the bore of the bobbin, said line-clip is seated in the other end of the bore, and said resilient means extends thru the bore and holds both said line-catches and said line-clip in place.

5. A bobber comprising a buoyant bobbin having a bore therethru, a coil spring positioned within said bore, a helical wire line-catch held against one end of the bobbin by one end of said coil-spring, a clip resiliently held against the other end of the bobbin by the other end of the coil-spring and forming with said other side a line-clip, flanges on said bobbin, a second helical wire line-catch disposed on the outside of the flange at said other end of the bobbin, holes thru the last-mentioned flange adjacent to the ends of the second-mentioned helix, and holes in the other flange generally opposite the aforesaid holes, the ends of the wire which form said second-mentioned helix each running therefrom thru one of the holes in the first-mentioned flange and one of the holes in the second-mentioned flange and being bent over beyond the latter one of said holes to hold the second-mentioned helix in place.

6. A bobber as set forth in claim 5, wherein there is provided a handle-loop at said other end of said coil spring and in a position such that said coil spring draws it against said line-clip to hold the same resiliently in place.

7. A bobber as set forth in claim 1 wherein there are provided handles extending outwardly from the ends of the first-mentioned helix to permit the helix to be spread when desired to receive a line.

AUGUST H. D. KLIE.

REFERENCES CITED

The following references are of record in the file of this patent:

UNITED STATES PATENTS

| Number | Name | Date |
|---|---|---|
| 240,611 | Redfield | Apr. 26, 1881 |
| 571,761 | Gulliford | Nov. 24, 1896 |
| 885,517 | Prescott | Apr. 21, 1908 |
| 1,274,776 | Preissner | Aug. 6, 1918 |
| 1,504,065 | Lower | Aug. 5, 1924 |
| 2,020,243 | Hathaway | Nov. 5, 1935 |
| 2,043,817 | Stuck | June 9, 1936 |
| 2,056,342 | Bunker et al. | Oct. 6, 1936 |
| 2,143,942 | Gruenhagen | Jan. 17, 1939 |
| 2,370,699 | Warren | Mar. 6, 1945 |
| 2,415,692 | Huston | Feb. 11, 1947 |
| 2,425,827 | Rancourt | Aug. 19, 1947 |

FOREIGN PATENTS

| Number | Country | Date |
|---|---|---|
| 534,101 | France | Mar. 18, 1922 |